July 10, 1956
A. D. EHRENFRIED
2,754,508
SECTOR PPI EXPANSION
Filed Jan. 29, 1946
2 Sheets-Sheet 1
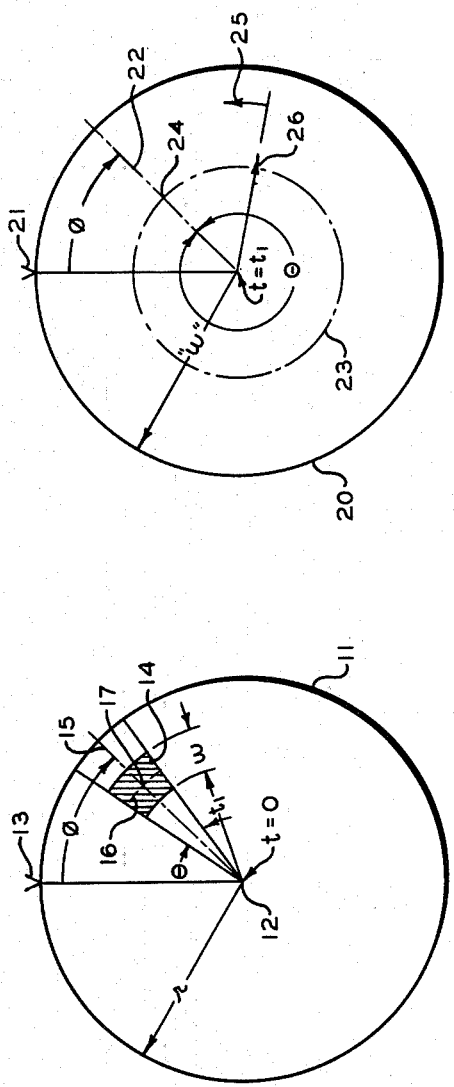
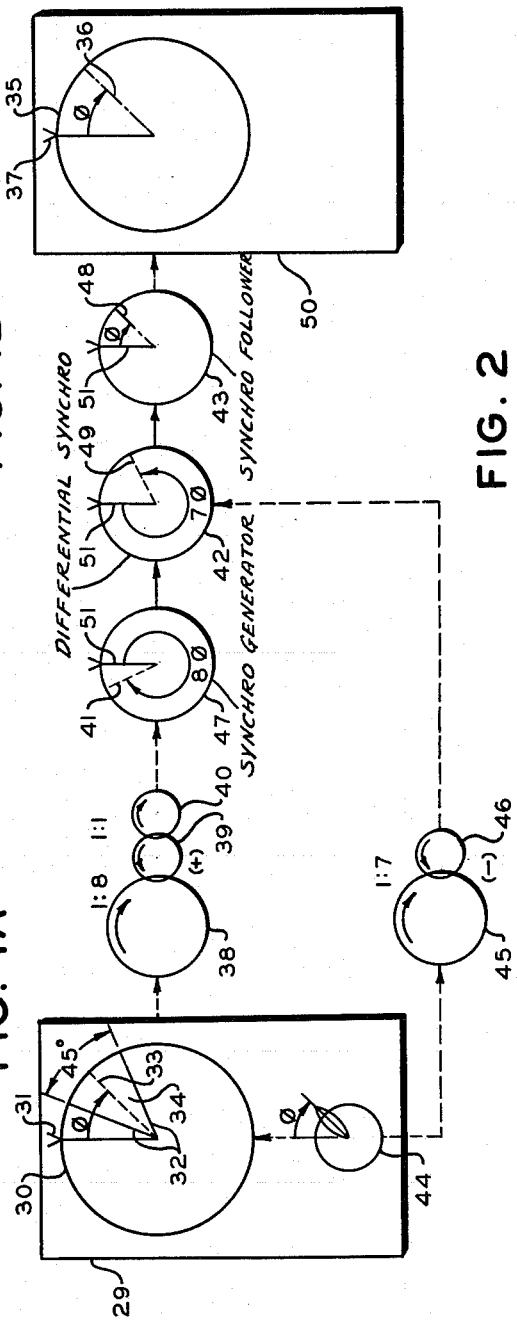
INVENTOR.
ALBERT D. EHRENFRIED
BY M. O. Hayes
ATTORNEY

INVENTOR.
ALBERT D. EHRENFRIED
BY
ATTORNEY

United States Patent Office 2,754,508
Patented July 10, 1956

2,754,508

SECTOR P. P. I. EXPANSION

Albert D. Ehrenfried, Boston, Mass., assignor, by mesne assignments, to the United States of America as represented by the Secretary of the Navy Application January 29, 1946, Serial No. 644,157

6 Claims. (Cl. 343—11)

This invention relates to apparatus adapted to enlarge a portion of the presentation of a cathode ray tube indicator, and is more specifically related to the expansion of indications presented by apparatus used in the field of radar.

One of the more common types of such oscilloscope indications is that produced by the plan position indicator which is more commonly known as the P. P. I., a designation to be used hereafter. In brief, the P. P. I. indication is a polar plot of the echoes of electromagnetic energy received by the radar system. These echoes appear on the indicator face by their causing instantaneous intensification of the oscilloscope electron beam which periodically sweeps radially outward from the center of the cathode ray tube, simulating the outward propagation of the radar R. F. energy. The azimuth angle at which this radial line is swept, measured with respect to a fixed radial reference line of the indicator, is determined by the instantaneous azimuth position of the radar antenna.

It is often desirable to expand a portion of the P. P. I. indication so that more accurate echo information can be obtained. Apparatus employed in the past for expanding P. P. I. indications has been extremely complex because the resultant indication is made a relatively undistorted enlargement of the original. In the present invention, the apparatus provided for enlarging a portion of a P. P. I. indication is made simple by the fact that the original P. P. I. indication is distorted in the process of enlargement, but in a manner which permits echo position information of the expanded indication to be readily interpreted.

A specific object of the present invention is to provide means for enlarging any desired portion of the presentation of a cathode ray tube indicator.

A further object is to provide a means for very accurately determining the range and azimuth position of a radar echo.

Another object is to provide an expanded radar indication having a conveniently oriented azimuth reference line.

An additional object is to provide an expanded radar indication, which affords maximum azimuth enlargement at close ranges where it is usually most needed.

A further object is to provide apparatus for producing an expanded radar indication, which apparatus can be employed with either electrical or mechanical P. P. I. deflection systems.

These objects will be apparent from the following description of the present invention, which is accompanied by several drawings of which:

Fig. 1A is a diagram of a conventional radar plane position indicator showing the portion thereof which is enlarged by apparatus of the present invention;

Fig. 1B is a diagram showing the expanded indication achieved by the apparatus of the present invention;

Fig. 2 is a schematic diagram illustrating the manner in which a convenient azimuth reference line is maintained on the expanded indication shown in Fig. 2.

Figure 3:
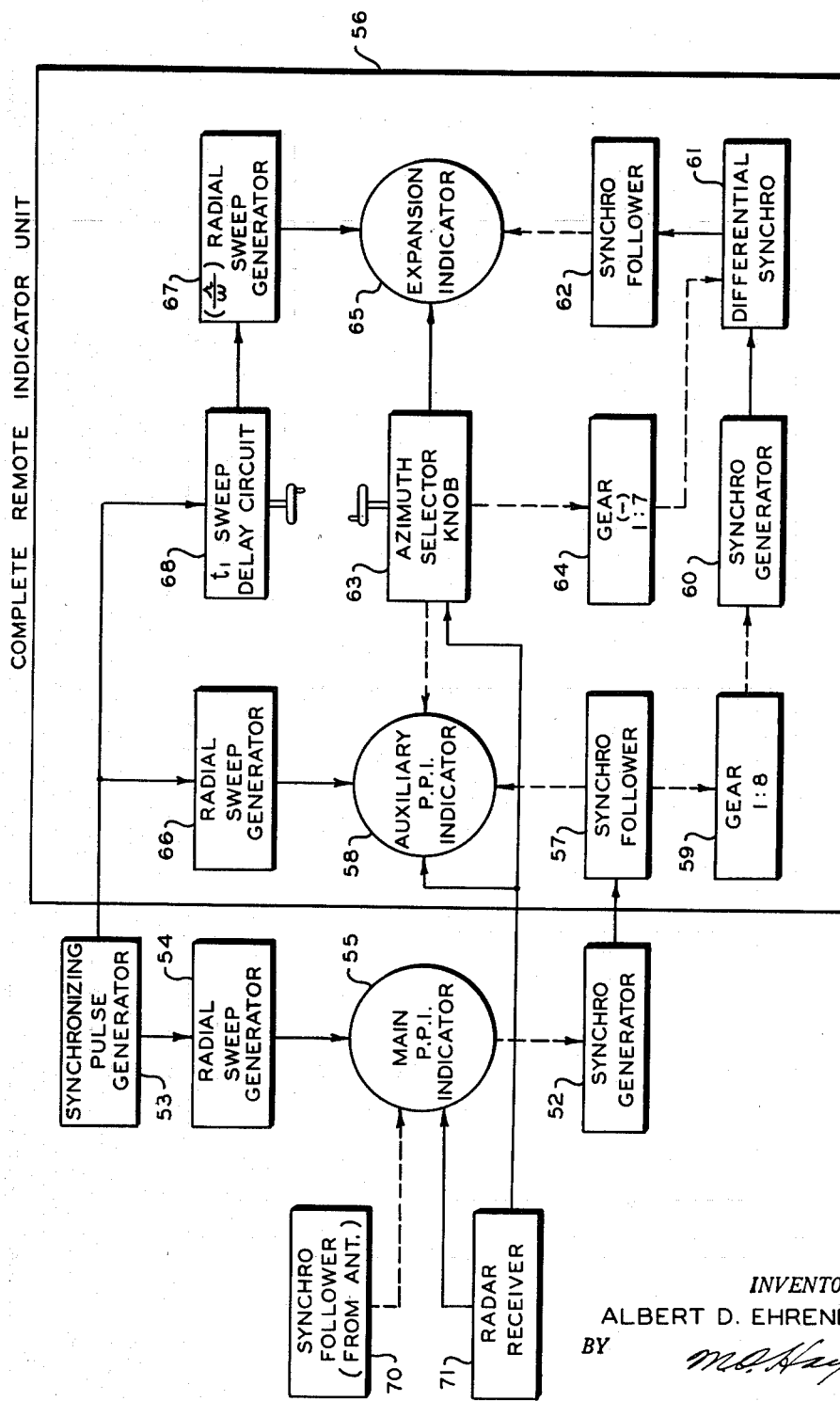
Fig. 3 is a block diagram showing the components associated with one form of the present invention.

Referring to the figures and more specifically to Fig. 1A, a conventional radar plan position indicator 11, called P. P. I., is shown having a radial sweep scanning line of length $r$ which rotates in synchronism with the radar antenna. As is conventional, the center 12 of the indicator face represents the time, $t=o$, of the radar output pulse, and the relative azimuth bearing of echoes appearing on the indicator is measured from a radial line through reference marker 13 at the top thereof.

Consider now the shaded portion 14 of the P. P. I. indication 11, having a center line 15 located at an azimuth angle $\phi$ from the radial reference line designated by the azimuth marker 13. This portion of the presentation has an angular width $\theta$ and a radial dimension $w$ and is swept out from a time $t_1$ after the initiation of the radar sweep. Conventional means are provided to indicate the boundaries of this area on the presentation 11. The center line 15 and a mid-range $$\left(\frac{w}{2}\right)$$

line 16 which is arcuately shaped and centrally disposed on the shaded portion 14 are also illuminated on the tube face, the latter two lines intersecting at a point 17.

By apparatus of the present invention, the shaded portion 14 of the indicator 11 is enlarged to totally fill a circular radar indicator, and the ultimate appearance of such an enlargement is shown in Fig. 1B. In this figure, the face of a cathode ray tube indicator 20 is shown having an azimuth reference marker 21 located at the top thereof. To make the shaded area 14 of Fig. 1A entirely fill the face of indicator 20, the radial sweep rate 26 of the indicator 20 is made greater than that of indicator 11 by the factor $$\frac{r}{w}$$

and the rotational sweep rate 25 of the indicator 20 is also made greater than that of indicator 11 by the factor $$\frac{360°}{\theta°}$$

With the sweep rates of indicator 20 so increased, and with the radial sweep of the indicator 20 initiated at a time $t=t_1$, the shaded portion 14 of indicator 11 is presented enlarged and altered in shape on the face of indicator 20.

To permit echoes appearing on indicator 20 to be readily correlated with those of indicator 11, apparatus is provided for placing the center line 15 of Fig. 1A at the same relative azimuth position on indicator 20 as it appears on indicator 11. The center line 22 of Fig. 1B, which is at an angle $\phi$ from the radial reference line designated by the azimuth marker 21, then corresponds to the center line 15 of Fig. 1A. In addition to the center line 22, a $$\frac{w}{2}$$

line 23, corresponding to line 16 of Fig. 1A, also appears on the face of indicator 20. These two lines intersect at a point 24 which corresponds to a point 17 of Fig. 1A.

As stated above, the rotational sweep rate of the indicator 20 is greater than that of indicator 11 by the factor $$\frac{360°}{\phi°}$$

and the radial sweep of indicator 20, after being delayed a time $t_1$ after that of indicator 11, is produced with a velocity $$\frac{r}{w}$$

times greater than that of indicator 11. The rotational sweep rate of indicator 20 can be increased by the use of step-up gearing, and the radial sweep of indicator 20 can be controlled by a conventional delay circuit in coordination with a sweep circuit designed to produce rapid sweeps.

A variety of means may be used for selecting the shaded portion 14 of indicator 11 for which expansion is desired. To position the center line 15, a slip ring of angular width $\theta$ may be associated either with the radar antenna or the rotating sweep element of indicator 11 to serve as a switch for illuminating indicator 20 of Fig. 1B only when the sector of indicator 11 symmetrical about the center line 15 is being swept. In addition, the radial sweep delay circuit may be provided with delay time control so that the time $t_1$ can be adjusted as desired. A conventional gate circuit may be employed to switch off radar echoes coming to indicator 20 just before and just after the radial distance $w$ has been swept out. Although the indicator system being described is one wherein a region of fixed angular width $\theta$ and fixed radial thickness $w$ is enlarged, the present invention can be adapted to provide for the expansion of a region of an indicator scope having variable angular and radial dimensions.

To place the center line 22 of Fig. 1B at the same indicator azimuth position as the center line 15 of Fig. 1A, apparatus schematically illustrated in Fig. 2 is provided. In this figure, radar indicator units 29 and 50 are shown having circular presentations 30 and 35. Overlapping circles 38, 39, and 40, and 45 and 46 symbolize gears intermeshed with one another and having speed ratios as indicated on the drawing.

Units 47, 42, and 43 schematically represent synchros, namely a generator 47, a follower 43, and a differential synchro 42. Imaginary radial reference lines 51 are shown on each of the three synchros 47, 42, and 43, and it is from these lines that the angular positions of the synchro rotors which are indicated by the dot-dash lines 41, 49, and 48 are measured. The broken lines of Fig. 2 signify mechanical coupling or interrelation, and the solid lines indicate electrical connections. The arrows on these connecting lines point in the direction in which mechanical or electrical information flows.

Indicator 29 of Fig. 2 is a conventional P. P. I. having an azimuth reference marker 31 at the top of its circular presentation 30 and a sector 34, chosen to be 45° for the purposes of illustration only, bounded by radial lines 32. A center line 33 is disposed at some angle $\phi$ from the radial line defined by the reference marker 31. The sector 34 is expanded in azimuth until it completely fills the radar presentation 35 of indicator 50, and in such a manner that echoes appearing on the center line 33 of presentation 30 lie on the center line 36 of presentation 35, the latter center line being likewise located at an angle $\phi$ from the radial azimuth line through reference marker 37.

To achieve the desired expansion, the rotational sweep rate of indicator 50 is made eight times as great as that of indicator 29 by means of step-up gears 38, 39, and 40. Gear 40 is directly coupled to the synchro generator 47, and it can be seen that rotation of the center line 33 of indicator 29 through an angle $\phi$ by motion of the azimuth control knob 44 of that indicator causes the rotor line 41 of synchro 47 to move through an angle 8 $\phi$. Thus it can be seen that if the indicator 50 were directly coupled to gear 40 or synchro coupled to synchro 47, the center line 36 of that indicator would be at an angle far different from that of the center line 33 of indicator 30.

To bring about the desired center line synchronism, a differential synchro 42 is introduced between the synchro generator 47 and a synchro follower 43. The differential synchro 42 is electrically connected to synchro 47 and mechanically coupled to the knob 44 controlling azimuth angle $\phi$. The mechanical coupling is provided by gears 45 and 46 which increase the angular motion of the control knob 44 by a ratio of 1 to 7 and reverse the direction of such motion. With the differential synchro 42 directly coupled to gears 46, a negative 7 $\phi$ angle, as indicated by the rotor line 49 of synchro 42, is added to the undesired 8 $\phi$ rotation of synchro generator 47. The synchro follower 43 is driven by synchro generator 47 through differential synchro 42 and its reference line 48 thus experiences only a rotation through the angle $\phi$. It is this angular displacement that is directly conveyed to the center line 36 of the indicator 35. With the $\phi$ control knob 44 held stationary, the differential synchro 42 does not interfere with the rotational sweep of the presentation 35 moving at eight times the normal azimuth sweep rate of the presentation 30.

Fig. 3 is a block diagram of the essential components of a complete indicator unit which is one form of the present invention. Broken and solid lines indicate mechanical and electrical coupling respectively, as in Fig. 2. Synchro follower 70, which receives electrical angle information directly from the antenna, drives the rotational sweep mechanism of the main P. P. I. indicator 55 and is mechanically coupled to the synchro generator 52. The synchronizing pulse generator 53 triggers a conventional radial sweep generator 54 which is, in turn, associated with the indicator 55. Radar echoes which serve to intensity modulate the electron beam of the indicator 55 are electrically coupled from the radar receiver 71 to indicator 55.

To provide a complete indicator unit which can be located at some distance from the components just cited and which includes a conventional P. P. I. having associated therewith the expanded indicator of the present invention, the components contained in the block unit 56 of Fig. 3 are employed. The remote synchro follower 57 is driven by the synchro generator 52 and, in turn, mechanically drives the rotational sweep mechanism of an auxiliary P. P. I. indicator 58. In addition, synchro 57 is coupled to gears 59 having an 8 to 1 step-up ratio. The final high-speed gear of unit 59 is mechanically coupled to synchro generator 60 which is electrically connected in conventional manner to a differential synchro 61.

The azimuth selector knob 63 determines the angle $\phi$ which is the relative azimuth angle of the sector being enlarged. The apparatus included in azimuth selector knob unit 53 may be a conventional switching device for determining the angular width, $\theta$ of the P. P. I. sector being expanded. The same switching device is used to provided radial lines on the faces of indicators 58 and 65 and to direct the radar echoes from receiver 71 to indicator 65 when the portion to be enlarged is being swept out.

The azimuth selector knob 63 is mechanically coupled to gears 64 which reverse motion of the knob and increase it by a ratio of 7 to 1. Differential synchro 61 is directly controlled by the final high speed gear of gears 64, and is electrically coupled in conventional manner to synchro follower 62. Synchro follower 62 controls the rotational sweep mechanism of the indicator 65 on which the desired expanded presentation is placed.

It will be obvious to those versed in the art that for the degree of accuracy required in a system of the type described herein, high speed synchros will undoubtedly have to be used in coordination with the low speed synchros. This technique being conventional, it will not be discussed further.

The radial sweeps of P. P. I. 55 and auxiliary indicator 58 are controlled by the synchronizing pulse generator 53 in a manner well known, while the radial sweep of the expansion indicator 65 is produced by sweep generator 67 operated in coordination with the variable $t_1$ sweep delay circuit 68. As previously discussed, sweep generator 67 produces a radial line on indicator 65 having a sweep rate substantially greater than that of indicators 55 and 58.

The expanded indication produced by apparatus of the present invention offers a number of operational advantages. Both the center lines 15 and 22 and the $$\frac{w}{2}$$

lines 16 and 23 of Figs. 1A and 1B appear on the indicators, and to locate the position of a target very accurately, it is necessary merely to place the target first approximately on the intersection 17 of Fig. 1A, and then more accurately on the intersection 24 of Fig. 1B. The azimuth of the echo is then read precisely on the expansion indicator, and the range, on the adjustable $t_1$ sweep delay circuit which may be accurately calibrated. In addition, the closer the echo being tracked approaches the radar unit, the greater is the relative azimuth expansion produced, and very accurate information can thus be had when it is most needed.

The invention described in the foregoing specification need not be limited to the details shown, which are considered to be illustrative of one form the invention may take.

What is claimed is:

1. In a radar system having a rotating antenna, apparatus for expanding a portion of a radar plan position indication, said apparatus comprising first and second cathode ray tubes, the sweep rotation mechanism of said first tube being directly synchronized with the antenna of said radar, means coupled to the sweep rotation mechanism of said first tube for increasing the speed of rotation thereof in a ratio of 1 to $n$, said means being in turn coupled to the sweep rotation mechanism of said second tube through a synchro generator, a differential synchro, and a synchro follower in succession, means responsive to the sweep rotation mechanism of said first tube for selecting an angular sector of the indication of said first tube, means operative on said selecting means for reversing and increasing the rotation thereof in a ratio of 1 to $(n-1)$, said means being directly controlled by said differential synchro, a pulse delaying circuit operative on the sweep generating means of said second tube, and a pulse generator for providing pulses to said delay circuit and to said radial sweep generating means of said first tube, the sweep of said second generating means being substantially faster than that of said first means.

2. In a radar system having a rotating antenna, apparatus comprising first and second plan position indicators, the radial sweep line of said first indicator rotating in synchronism with said antenna of said radar, means for rotating the radial sweep line of said second indicator at an angular velocity substantially greater than that of said first indicator, a first switching means for allowing the radar echoes of a chosen sector of said first indicator to be presented on said second indicator, the radial sweep velocity of said second indicator being substantially greater than that of said first indicator, a second switching means for allowing the radar echoes of a chosen portion of the radial sweep of said first indicator to be presented on said second indicator, and means operative on said first and second indicators for maintaining a predetermined angular relation between the center line of the chosen sector of said first indicator and the center line of the expanded pattern of said second indicator, said means comprising a coupling means responsive to the sweep rotation mechanisms of said first and second indicators for causing the rotational sweep velocity of said second indicator to be a number of times greater than that of said first indicator, and means in synchronous response to said coupling means for rotating the center line of said second indicator one rotation less than said number of times the angle through which the center line of said first indicator is rotated and in the opposite direction thereof.

3. In an object detecting system employing a rotating antenna for periodically radiating a directional beam of radio frequency search pulses and for subsequently detecting these pulses after reflections from remote targets, the combination of a first cathode ray tube, means for applying reflected pulses to an electrode of said tube to control the intensity of the cathode ray beam trace on the tube screen, means for instituting simultaneously with the radiation of said search pulses a radial sweep of the electron beam of said tube and for maintaining rotational synchronism between said radial sweep and said antenna thereby to produce a plan position presentation of targets detected by said system, means for delineating a selected arcuated sector of said tube screen, a second cathode ray tube, means for controlling the movement of the electron beam of said second tube to produce a plan-position presentation of said sector occupying substantially the complete screen of said second tube, said last-mentioned presentation being produced while said selected sector is being swept by the electron beam of said first cathode ray tube and means for applying delayed reflected pulses to a control electrode of said second tube.

4. In a system as defined in claim 3 wherein said reflected pulses are delayed by a time interval equivalent to the radial displacement of said arcuated sector from the center of the screen of said first tube.

5. In a radar system having a rotating antenna for periodically radiating a directional beam of radio frequency search pulses and for subsequently detecting these pulses after reflections from remote targets, the combination of a first cathode ray tube, means for applying reflected pulses to a control electrode of said tube to control the intensity of the electron beam trace on the screen of said cathode ray tube, means for deflecting the electron beam of said tube radially from the center of said screen in synchronism with the radiation of said search pulses and angularly from a predetermined reference point in synchronism with the rotation of said antenna to produce a plan-position presentation of targets detected by said system, means for controlling the intensity of the electron beam trace to delineate a selected arcuate sector of said screen, a second cathode ray tube, means for controlling the deflection of the electron beam of said second tube to produce a plan-position display of said sector occupying substantially the complete screen of said second tube, means for applying delayed reflected pulses to a control electrode of said second tube, and means for maintaining a predetermined angular relationship between the center line of said selected arcuate sector and the center line of said plan-position display.

6. In a system as defined in claim 5 wherein the center line of said selected sector and said center line of said plan position display occupy the same relative position on their respective cathode ray tube screens.

References Cited in the file of this patent

UNITED STATES PATENTS

| | | |
|---|---|---|
| 2,355,363 | Christaldi | Aug. 8, 1944 |
| 2,406,970 | Smith | Sept. 3, 1946 |
| 2,408,414 | Donaldson | Oct. 1, 1946 |
| 2,412,669 | Bedford | Dec. 17, 1946 |
| 2,421,747 | Englehardt | June 10, 1947 |
| 2,440,250 | Deloraine | Apr. 27, 1948 |
| 2,477,651 | Ranger | Aug. 2, 1949 |